US012782875B2

(12) United States Patent
Ruchti et al.

(10) Patent No.: US 12,782,875 B2
(45) Date of Patent: Nov. 3, 2026

(54) BEARING FOR A TIMEPIECE

(71) Applicant: ETA SA Manufacture Horlogère Suisse, Grenchen (CH)

(72) Inventors: Cyril Ruchti, Yverdon-les-Bains (CH); Antonio Merino, Moutier (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 302 days.

(21) Appl. No.: 18/656,648

(22) Filed: May 7, 2024

(65) Prior Publication Data

US 2024/0411271 A1 Dec. 12, 2024

(30) Foreign Application Priority Data

Jun. 6, 2023 (EP) .................................... 23177607

(51) Int. Cl.
*G04B 31/02* (2006.01)

(52) U.S. Cl.
CPC .................................... *G04B 31/02* (2013.01)

(58) Field of Classification Search
None
See application file for complete search history.

(56) References Cited

U.S. PATENT DOCUMENTS 2,621,469 A 12/1952 Erismann

FOREIGN PATENT DOCUMENTS

| | | | |
|---|---|---|---|
| CH | 316840 | A | 12/1956 |
| CH | 708 089 | A2 | 11/2014 |
| CH | 708 090 | A2 | 11/2014 |
| FR | 909 586 | A | 5/1946 |
| FR | 955 445 | A | 1/1950 |
| FR | 1 188 027 | A | 9/1959 |
| JP | 42-214 | Y | 1/1967 |
| KR | 10-2021-0079189 | A | 6/2021 |

OTHER PUBLICATIONS

Japanese Office Action issued May 27, 2025, in corresponding Japanese Patent Application No. 2024-081450 (with English Translation), 10 pages.
Korean Office Action issued on Nov. 28, 2025 in Korean Patent Application No. 10-2024-0068750 (with unedited computer-generated English translation), 11 pages.
European Search Report issued Nov. 3, 2023 in European Application 23177607.1 filed on Jun. 6, 2023, 3 pages (with English Translation of Categories of Cited Documents).

*Primary Examiner* — Renee S Luebke
*Assistant Examiner* — Michael James Walker
(74) *Attorney, Agent, or Firm* — Oblon, McClelland, Maier & Neustadt, L.L.P.

(57) ABSTRACT

A bearing for a timepiece including a bearing housing with a through-opening, the opening including a stressed, compact assembly including a first resilient member mounted in a first orifice of the through-opening; a second resilient member arranged between the first resilient member and a second orifice of the opening; a pivot element for pivoting a staff of a timepiece component, the element being arranged in a central zone of the second resilient member and positioned facing the second orifice through which the staff of the component can be inserted into the opening, and an endstone element interposed between the first and second resilient members.

14 Claims, 2 Drawing Sheets

BEARING FOR A TIMEPIECE

CROSS-REFERENCE TO RELATED APPLICATION

This application claims priority to European Patent Application No. 23177607.1 filed on Jun. 6, 2023, the entire disclosure of which is hereby incorporated herein by reference.

TECHNICAL FIELD OF THE INVENTION

Embodiments of the present invention relate to a bearing for a timepiece, in particular a shock-absorbing bearing, for a staff of a timepiece component. The invention further relates to a horological movement provided with such a bearing. The invention further relates to a timepiece comprising such a bearing and/or such a timepiece movement.

Technological Background

In timepieces, the staffs of timepiece components typically have pivots at their ends which rotate in bearings mounted in blanks, such as the plate, or in the bridges of horological movements. For some timepiece components, in particular balances, it is common practice to fit the bearings with a shock-absorbing mechanism. This is because as the staff pivots of these balances are typically thin and the masses of these balances are relatively high, the pivots can break under the effect of a shock in the absence of shock-absorbing mechanisms.

In the prior art, a conventional shock-absorbing bearing commonly comprises a bush such as a drilled jewel provided with a through-hole forming an axial and radial guiding element for the pivot. Such a jewel is driven into a bearing support, commonly referred to as a setting, on which an endstone is mounted, forming an axial stop for the pivot. This setting is intended to transform a radial shock into an axial shock. Such a setting is held against the back of a bearing housing by resilient means, typically a damping spring, arranged to exert an axial stress on the upper part of the endstone. This staff pivot is inserted into the through-hole in the drilled jewel. Such a bearing absorbs shocks, as the assembly formed by the setting, the drilled jewel and the endstone can move thanks to the damping spring.

However, one of the major drawbacks of such a bearing is its lack of robustness, due in particular to the ageing of the lubricant it contains or to wear over time, which alters its operation and makes it less reliable. As a result, such a bearing can no longer guarantee perfect radial recentring of the balance staff in the event of a shock, as this recentring is often random. The problem here lies in the fact that the movement's rate is set at a given moment T, in a given shock-resistant configuration. Following a shock, the configuration of the bearing changes due to imperfect recentring, for example, and the rate adjustment previously carried out is then no longer optimal. In other words, the position of the balance staff has a direct impact on the rate of the movement, and this recentring error must thus be overcome in order to improve chronometric stability.

SUMMARY OF THE INVENTION

One of the aims of the invention is to provide a bearing for a timepiece, which bearing has small dimensions and allows the staff of a timepiece component to be repositioned extremely efficiently at all times.

Another aim of the invention is to provide a bearing for repeatedly positioning the staff of a timepiece component.

Another aim of the invention is to provide a bearing of small dimensions.

To this end, the invention relates to a bearing for a timepiece comprising a bearing housing provided with a through-opening, said opening comprising a stressed, compact assembly including:

- a first resilient member mounted in a first orifice of the through-opening;
- a second resilient member arranged between the first resilient member and a second orifice of said opening;
- a pivot element provided for pivoting a staff of a timepiece component, said element being arranged in a central zone of the second resilient member and being positioned facing the second orifice through which said staff of said component can be inserted into said opening, and
- an endstone element interposed between the first and second resilient members, which is intended to receive an end part of said staff of the component, said endstone element being constituted by a central part and a peripheral part, the central part comprising a cavity in which a part of the pivot element may be arranged and said peripheral part comprising a contact zone configured to bear against an entire periphery of a flat upper face of the second resilient member.

In other embodiments:

- the central part and the peripheral part respectively form a tip and a base of the endstone element;
- the endstone element is mounted so as to be axially movable in the through-opening relative to an axis of revolution of this opening;
- the central part of the endstone element is configured so that it can be inserted into the first orifice of the through-opening in the event of a shock to which the timepiece may be subjected;
- the peripheral part of the endstone element comprises a stop zone configured to cooperate with the first resilient member in the event of a shock to which the timepiece may be subjected;
- the part of the pivot element arranged in the cavity protrudes from the central zone of the second resilient member, this part comprising an outer surface which is positioned in the vicinity of a back of the cavity;
- the first resilient member is configured to deform essentially axially relative to an axis of revolution of the through-opening;
- the first resilient member comprises elements for fastening this member in the through-opening and stressing elements intended to bear against the central part of the endstone element and connecting elements connecting the stressing elements and the fastening elements together;
- the second resilient member comprises a part for connecting this member in the through-opening and a part for fastening the pivot element in a central zone of that member, said connecting and fastening parts being connected to each other by at least one resilient element of that member;
- the second resilient member is fixedly mounted in the bearing housing;
- the second resilient member is configured to deform essentially radially relative to an axis of revolution of the through-opening;
- the bearing housing, the through-opening, the first and second resilient members, the endstone element and the pivot element have axes of revolution which are coincident with a central axis of the bearing.

Another aspect of the invention relates to a horological movement fitted with such a bearing.

Another aspect of the invention relates to a timepiece comprising such a horological movement.

BRIEF DESCRIPTION OF THE FIGURES

Other features and advantages of the invention will become clearer on reading the following description of a particular embodiment of the invention, given merely as an illustrative and non-limiting example, and of the accompanying drawings, among which.

DETAILED DESCRIPTION OF THE INVENTION

FIGS. 1 to 4 illustrate one embodiment of a bearing 1 for a timepiece such as a watch, in particular a wristwatch. Such a bearing 1 can be part of a horological mechanism of a horological movement such as an electronic movement or a mechanical movement. By way of example, the horological mechanism can be a sprung balance type oscillator provided with a balance and a spring.

This bearing 1, also referred to as a "horological bearing", "shock-resistant bearing" or "shock-absorbing bearing", is particularly suitable for pivoting a ceramic or glass staff, in particular a staff pivot. Such a staff, also referred to as a "rotary staff" or "pivoting staff" or "arbor", can be a staff of a timepiece component, also referred to as a "staff of a rotary, mobile part", such as a balance pivot shank when the horological mechanism is an oscillator.

Such a bearing 1 is effectively configured to guide the staff of the timepiece component rotatably about the central axis A1 of the bearing 1, otherwise referred to as the axis A1 of the mounted bearing, and also to stop this staff translationally, in particular to limit its axial and/or radial translation relative to the axis A1.

It should be noted that guiding the staff of this timepiece component also comprises guiding the component itself, which then sees its axial and/or radial translations relative to the axis A1 limited by this bearing 1.

Such a bearing 1 is intended to be assembled or rigidly connected to a blank of the horological movement such as a bridge, for example a balance bridge, or a plate. Alternatively, this bearing 1 can be formed directly in the body of a plate or a bridge, for example by machining.

Figure 4:
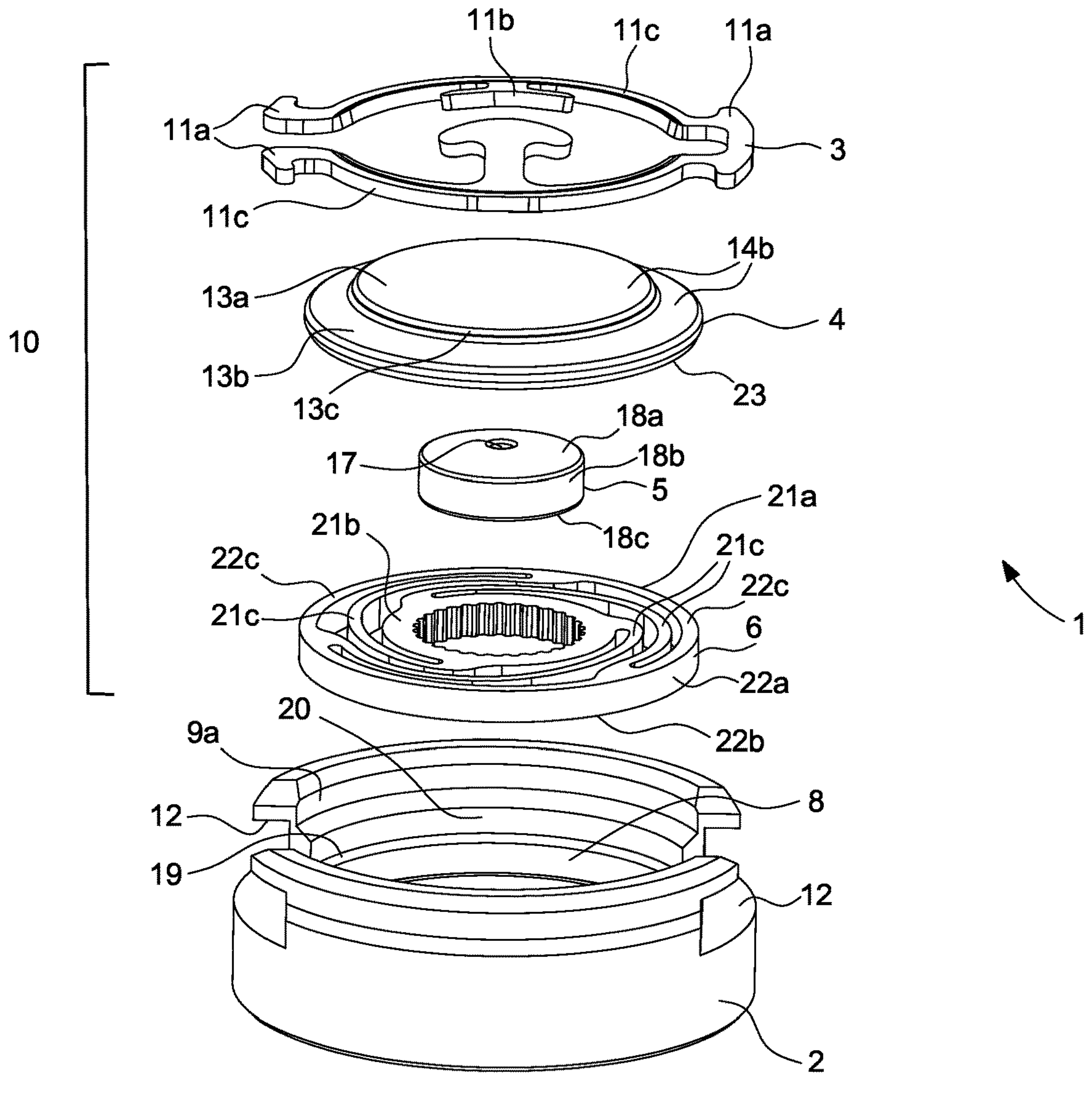
FIG. 4 is an exploded view of all of the parts forming the bearing, according to the embodiment of the invention.

With reference to FIG. 4, the bearing 1 comprises a bearing housing 2 which is configured to receive a compact assembly 10 consisting of the following components: a pivot element 5, an endstone element 4 and first and second resilient members 3, 6.

This bearing housing 2 comprises a through-opening 8, also referred to as a "central through-opening", extending in a direction parallel to that of an axis of revolution A2 of this bearing housing 2, also referred to as the axis of the unit. Such a through-opening 8 comprises first and second orifices 9*a*, 9*b* at each of its ends. It should be noted that the first orifice 9*a* has a cross-section which is preferably larger than the cross-section of the second orifice 9*b*. As we shall see later, the first orifice 9*a* is configured to help mount the first resilient member 3 in the through-opening 8 and the second orifice 9*b* is configured to allow the staff of the timepiece component to be inserted into this same opening 8.

In this bearing housing 2, the through-opening 8 comprises an axis of revolution A3, also referred to as the axis of the opening 8, which is coincident with the central axis A1 of the bearing 1. Such a through-opening 8 has a geometry of revolution about this axis A3 which forms a bed or an enclosure for this bearing housing 2. It should be noted that this bed corresponds to the volume defined in the bearing housing 2 by an inner peripheral wall 20 of the through-opening 8 visible in FIG. 4. In this configuration, such a bed thus extends between the first and second orifices 9*a*, 9*b* which form part of such a bed.

In this bearing 1, the through-opening 8 is configured to receive or to participate in the arrangement, or mounting, of the compact assembly 10 in the bearing housing 2. In this configuration, the compact assembly 10 comprises mounting zones 11*a*, 21*a*, 22*a*, 22*b* intended to cooperate with the inner peripheral wall 20 of the through-opening 8 in order to ensure the arrangement of this compact assembly 10 in the bearing housing 2. Such mounting zones 11*a*, 21*a*, 22*a*, 22*b* are included in/on the first and second resilient members 3, 6 of this assembly 10. In one alternative embodiment, these mounting zones 11*a*, 21*a*, 22*a*, 22*b* are included exclusively in/on the first and second resilient members 3, 6. In other words, these mounting zones 11*a*, 21*a*, 22*a*, 22*b* are the only parts of this compact assembly 10 which carry out/ensure its mounting in the bearing housing 2 to form the bearing 1. As will be seen later, these mounting zones 11*a*, 21*a*, 22*a*, 22*b* cooperate with this bearing housing 2 by bearing against and/or being fastened to this housing 2.

In this assembly, the pivot element 5, the endstone element 4, the first resilient member 3 and the second resilient member 6 respectively comprise central axes A4, A5, A6, A7. These axes referenced A4, A5, A6, A7 are coincident with the axes A1, A2, A3 respectively of the bearing 1, of the bearing housing 2 and of the through-opening 8 when the compact assembly 10 is mounted in the bearing housing 2.

As already mentioned, this compact assembly 10 is formed by the following succession of components: the first resilient member 3, the endstone element 4, the second resilient member 6 comprising the pivot element 5.

The first resilient member 3, which is for example a resilient element of the return spring type, is intended to resiliently return and adequately axially replace the endstone element 4 and thus the staff of the timepiece component within the opening 8 of the bearing housing 2 following a substantially axial shock suffered by the timepiece, in particular suffered by the horological movement of this timepiece. In other words, the first resilient member 3 is configured to deform essentially axially relative to the axis of revolution A3 of the through-opening 8. In other words, this first member 3 is configured to always axially reposition the staff of the timepiece component in the same place, being constructed in such a way as to absorb substantially axial shocks. It is thus understood that this member 3 is configured to place the staff of the timepiece component axially relative to the axis of revolution referenced A3, in its initial or rest position in response to these shocks.

Such a first resilient member 3 is rigidly connected or fastened to the bearing housing 2. More specifically, this first resilient member 3 is mounted in the first orifice 9*a* of the through-opening 8. For this purpose, this first resilient member 3 comprises at least one connecting element 11*c*, at least one stressing element 11*b* and at least one fastening element 11*a* which are connected together.

More specifically, this member 3 comprises fastening elements 11*a*, also referred to as "rigid connection elements", which are configured so as to be arranged in notches 12 formed in the first orifice 9*a* of the opening 8. With reference to FIG. 4, this first member 3 comprises two fastening elements 11*a*. Each fastening element 11*a* is configured to be arranged in the notch 12 provided in the through-opening 8 in order to help mount this first resilient member 3 in this opening 8. It should be noted that these fastening elements 11*a* form part of the mounting zones 11*a*, 21*a*, 22*a*, 22*b* of the assembly 10 in the bearing housing 2 referred to above.

The first resilient member 3 further comprises stressing elements 11*b* which are in contact with the endstone element 4. More specifically, the stressing elements 11*b* are intended to bear against a central part 13*a* of the endstone element 4, in particular on a tip 13*a* of this endstone element 4. These stressing elements 11*b* are configured to apply to this endstone element 4 an essentially axial return force, in particular an axial and resilient force. With reference to FIG. 4, it should be noted that this first resilient member 3 preferably comprises two stressing elements 11*b*.

The first resilient member 3 further comprises connecting elements 11*c* connecting the stressing elements 11*b* and the fastening elements 11*a* together. In this first resilient member 3, there are two of these connecting elements 11*c*, as can be seen in FIG. 4.

In this compact assembly 10, the endstone element 4 is intended to receive an end part (or an end) of the staff of the timepiece component corresponding to the end of the pivot, or to constitute an abutment for the end part of this staff. In the through-opening 8, the endstone element 4 is interposed between the first and second resilient members 3, 6. Such an endstone element 4 is mounted so as to be axially and radially movable in such a through-opening 8 relative to the axis of revolution A3 of this opening 8.

This endstone element 4 consists of the central part 13*a* and of a peripheral part 13*b* as well as of inner and outer faces 14*a*, 14*b*. It should be noted that in this element 4, the central part 13*a* is surrounded by the peripheral part 13*b*. Such an endstone element 4 comprises a step zone 13*c* which connects the central and peripheral parts 13*a*, 13*b* together and which is visible on the outer surface 14*b* of this element 4 illustrated in FIGS. 3 and 4. In this configuration, such central and peripheral parts 13*a*, 13*b* respectively form the tip 13*a* and a base 13*b* of the endstone element 4.

Figure 1:
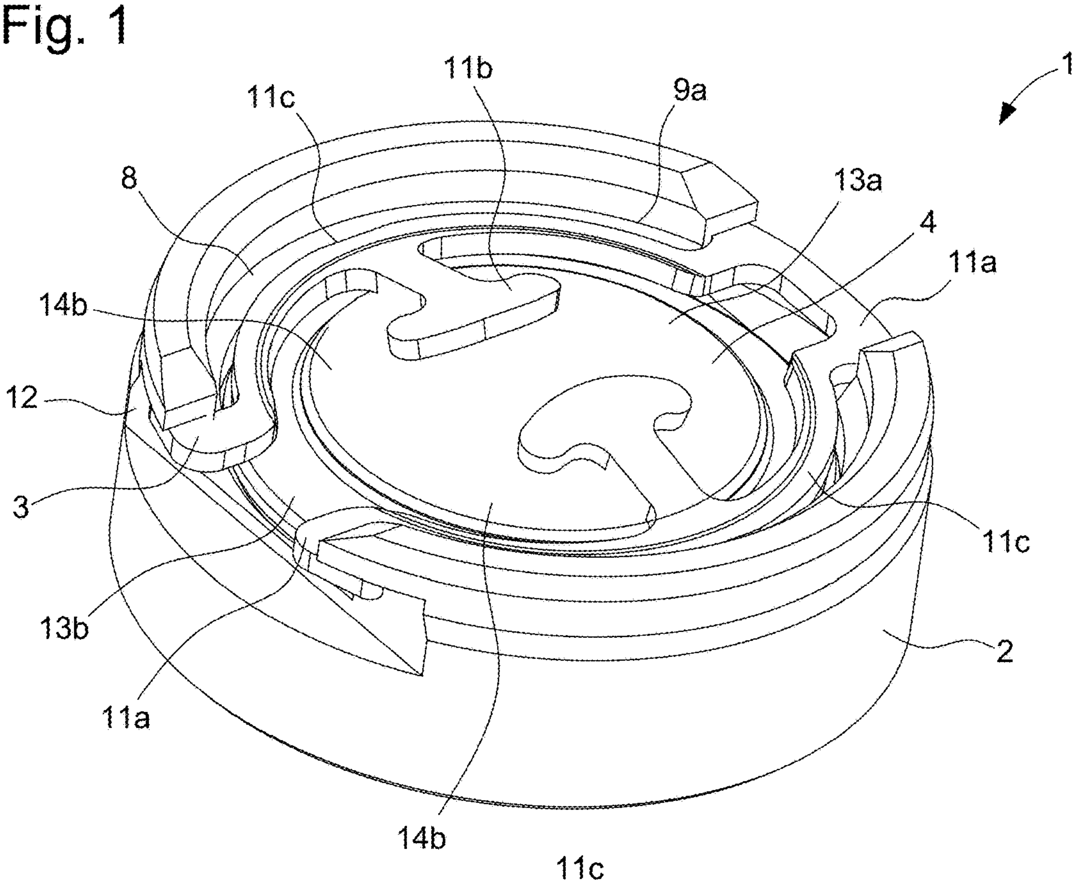
FIG. 1 is a perspective view of a bearing for a timepiece, according to one embodiment of the invention.
Figure 2:
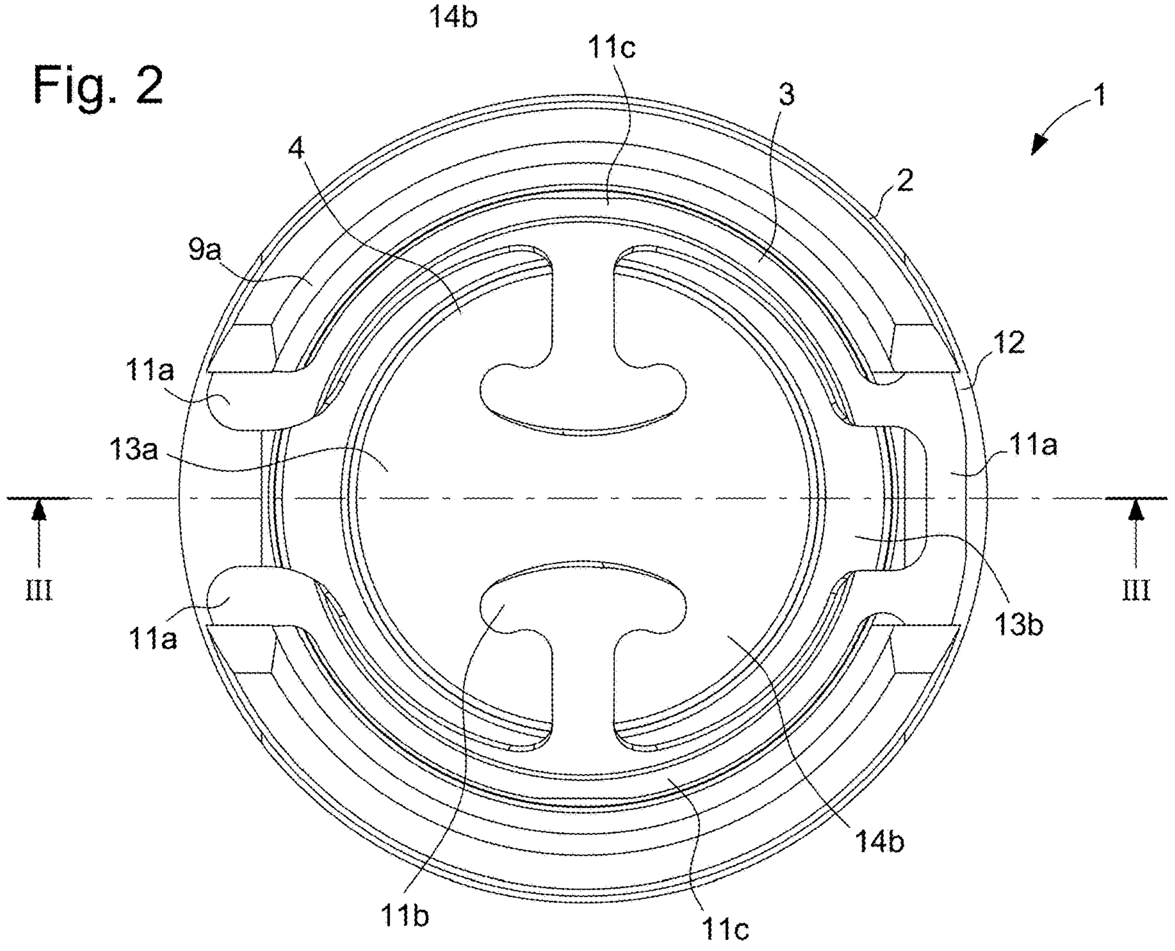
FIG. 2 is a top view of the bearing shown in FIG. 1, according to the embodiment of the invention.
Figure 3:
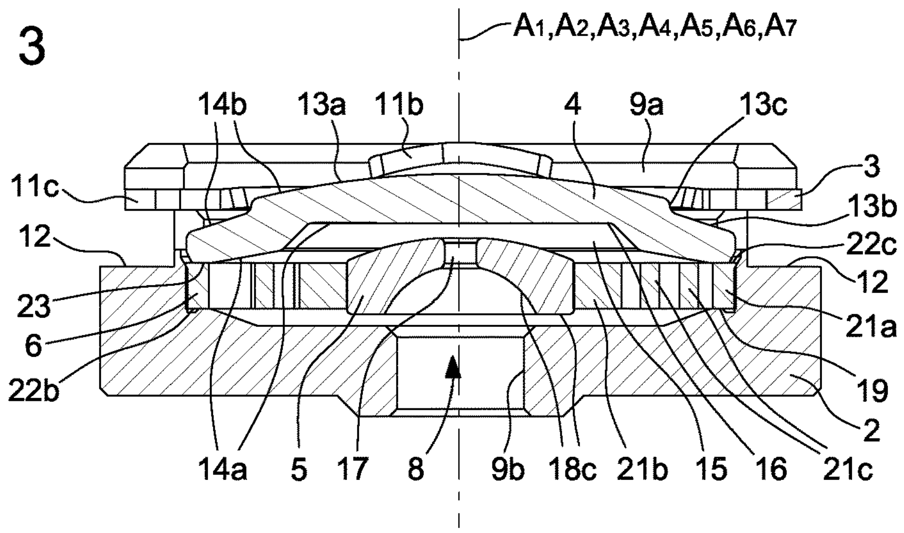
FIG. 3 is a sectional view along an axis III-III of the bearing shown in FIG. 2, in accordance with the embodiment of the invention.

In the inner face 14*a* of this endstone element 4, the central part 13*a* comprises a cavity 15, visible in FIG. 3, in which part of the pivot element 5 can be arranged as will be seen later. In this inner face 14*a*, the peripheral part 13*b* comprises a contact zone 23 configured to bear directly on a periphery of a flat upper face of the second resilient member 6. In one alternative embodiment, the contact zone 23 is configured to bear directly on the entire periphery of the flat upper face of the second resilient member 6. It should be noted that such a cavity 15 can be produced by machining, in particular by conventional machining with a diamond tool or even by laser machining.

As mentioned previously, the central part 13*a* and the peripheral part 13*b* respectively form the tip 13*a* and the base 13*b* of this endstone element 4. This tip 13*a* is configured/shaped to be inserted into the first resilient member 3, in particular into a space defined therein, which space is delimited by the connecting elements 11*c* of this first resilient member 3, in particular during a substantially axial shock to which the timepiece may be subjected. This base 13*b* is configured to form a stop zone for the endstone element 4 by cooperating with the first resilient member 3 during such a shock. In fact, such a stop zone is defined on a part of the outer face 14*b* of the endstone element 4 located on this base 13*b*. In this configuration, this stop zone is able to cooperate with the connecting elements 11*c* and the fastening elements 11*a* in order to limit the axial displacement of the staff of the timepiece component during a shock, in particular a substantially axial and strong shock.

Such an endstone element 4 can be, for example, an endstone made of a synthetic precious stone or a material that is not mono- or polycrystalline, such as ruby or zirconia, an element made of a metallic material or a silicon-based material (such as mono- or polycrystalline silicon, its oxide, nitride or carbide, which can also be mono- or polycrystalline).

In this compact assembly 10, the pivot element 5 is intended to pivot the staff of the timepiece component. This pivot element 5 comprises a central hole 17 for receiving this staff of the timepiece component and in particular the end part of this staff. This pivot element 5 is arranged in a central zone of the second resilient member 6, being positioned facing the second orifice 9*b* through which the staff of the timepiece component is capable of being inserted into said through-opening 8. Such a pivot element 5 comprises an upper surface 18*a*, a lateral surface 18*b* and a lower surface 18*c*, with the lateral surface 18*b* connecting these upper and lower surfaces 18*a*, 18*c* together. In this configuration, the upper surface 18*a* of this element 5 is arranged facing the inner face 14*a* of the endstone element 4 and the lower surface 18*c* facing the second orifice 9*b*. More specifically, this pivot element comprises a part protruding from the second resilient member 6 which is arranged in the cavity 15 of the endstone element 4 with the upper surface 18*a* which is positioned in the vicinity of a back 16 of this cavity 15.

Such a pivot element 5, also referred to as a "bush", can be a drilled jewel, typically made of a synthetic precious stone or of a material that is not mono- or polycrystalline, such as ruby or zirconia, or of a silicon-based material (such as mono- or polycrystalline silicon, its oxide, nitride or carbide, which can also be mono- or polycrystalline), or a ring made of metal.

In this compact assembly 10, the second resilient member 6 is fixedly arranged/mounted in the through-opening 8 and thus in the bearing housing 2. In this through-opening 8, this second resilient member 6 is arranged on a shoulder 19 included on the inner peripheral wall 20 of this opening 8. It should be noted that this shoulder 19 is located at the back of the orifice 9*a* and is orthogonal to the surface of the inner peripheral wall 20.

In this assembly 10, the second resilient member 6 is configured to deform essentially radially relative to the axis of revolution A3 of the through-opening 8. In other words, this second member 6 is configured to always radially recentre the staff of the timepiece component in the same place by being constructed in such a way as to absorb radial shocks.

More specifically, this second resilient member 6 comprises a part 21*a* for connection to the inner peripheral wall 20 of the through-opening 8, and a part 21*b* for fastening the pivot element 5 in the central zone of this member 6, said connecting and fastening parts 21*a*, 21*b* being connected to each other by at least one resilient element 21*c* of this second resilient member 6. It should be noted that the connecting and fastening parts 21*a*, 21*b* are rigid parts of this member 6 in comparison with the resilient element 21*c*. These connecting and fastening parts 21*a*, 21*b* are liable to deform elastically when subjected to stress.

Said at least one resilient element 21*c* is configured to ensure the radial deformation of the second resilient member 6 by controlling the displacement of the fastening part 21*b* relative to the connecting part 21*a* during shocks to the movement. In other words, the resilient element 21*c* is configured to place the connecting part 21*a* or the pivot element 5 or the staff of the timepiece component radially relative to the axis of revolution referenced A3, in its initial or rest position in response to shocks.

This second resilient member 6 also has flat top and bottom faces which are preferably substantially parallel to each other.

The connecting part 21*a* forms an outer peripheral wall of this second resilient member 6. In this configuration, when the second resilient member 6 is mounted in the through-opening 8, a lateral surface 22*a* of this peripheral wall, and thus of this connecting part 21*a*, rests on all or part of the inner peripheral wall 20 of this opening 8. More specifically, this connecting part 21*a* is configured to deform elastically when the second resilient member 6 is inserted into the through-opening 8. This connecting part 21*a* is then able to bear against the inner peripheral wall 20 of the opening 8 from its lateral surface 22*a*. By way of example, the second resilient member 6 can be inserted into this through-opening 8 by driving in.

This connecting part 21*a* further comprises a contact surface 22*b* which is configured to cooperate with the shoulder 19 included in the through-opening 8. With reference to the aforementioned example, it should be noted that the second resilient member 6 is inserted by driving into the through-opening 8 until it comes into abutment against the shoulder 19 of the through-opening 8 via the contact surface 22*b* of the connecting part 21*a*. It should be noted that this contact surface 22*b* is included on the flat lower face of this second member 6.

It is thus understood that such a connecting part 21*a* allows the second resilient member 6 to be fixedly arranged/mounted in the through-opening 8. In other words, this connecting part 21*a* helps to ensure that the second resilient member 6 is fastened or held in place with sufficient strength to prevent any axial, radial and/or angular relative displacement of this second member 6 relative to the axis of revolution A3 of the opening 8.

It should be noted that this connecting part 21*a* forms part of the mounting zones 11*a*, 21*a*, 22*a*, 22*b* of the compact assembly 10 in the bearing housing 2. In other words, the contact surface 22*b* and the lateral surface 22*a* of this connecting part 21*a* are included in these mounting zones 11*a*, 21*a*, 22*a*, 22*b*.

The connecting part 21*a* further comprises a support surface 22*c* forming/including the perimeter of the flat upper face which is configured to cooperate with the contact zone 23 of the endstone element 4. In fact, the base 13*b* of the endstone element 4 is able to bear directly on this support surface 22*c*. In the connecting part 21*a*, this support surface 22*c* is positioned above or vertical to the contact surface 22*b*. Moreover, this support surface 22*c* is substantially parallel to the contact surface 22*b*.

As already mentioned, the second resilient member 6 further comprises a part 21*b* for fastening the pivot element 5 in the central zone of this second member 6. This attachment part 21*b* forms an inner peripheral wall of this second resilient member 6. The pivot element 5 can be a part attached to this second member 6 with its lateral surface 18*b* which is configured to be wholly or partly connected to this inner peripheral wall. Such a connection can be made by driving in, bonding or welding.

It should be noted that in one alternative embodiment, this pivot element 5 can be an integral part of this second member 6 by being made in one piece with the fastening part 21*b*. In this configuration, the central zone of this second member 6 is then considered as being/forming this pivot element 5.

This second resilient member 6 can be produced by micro-fabrication, using a deep reactive ion etching process (usually referred to by its acronym "DRIE") for a member 6 comprising, in particular, silicon, or using a Liga process such as UV-Liga for a member 6 based, for example, on nickel.

Thus such a bearing 1 according to the invention has small/reduced overall dimensions compared with bearings of the prior art, without any consequence on the operation of this bearing 1. This reduced size is achieved in particular by the compact assembly 10 formed by the first and second resilient members 3, 6 and the endstone element 4 and pivot element 5, and more precisely by:

- the particular shape of the endstone element 4 which allows the central part 13*a* of this element 4, in this case the tip 13*a*, to move in the first orifice 9*a* of the through-opening 8 in the bearing housing 2;
- the particular shape of the endstone element 4 which allows its base 13*b* to rest directly on the flat upper face of the second resilient member 6 vertical to the shoulder 19;
- the presence of a cavity 15 in the inner face 14*a* of the endstone element 4, in which part of the pivot element 5 can be arranged;
- positioning the pivot element 5 in a central zone of the second resilient member 6, with a part of the body of this element 5 which is included in the thickness of this second resilient member 6.

It should be noted that in this bearing 1, the endstone element 4, by bearing on the upper face of the second resilient member 6, exerts only an axial and resilient force on the entire periphery of the flat upper face of this second resilient member 6 under the action of the stressing elements 11*b* bearing on the tip 13*a* of the endstone element 4. This force is then applied by the contact zone 23 of the endstone element 4 to the support surface 22*c* forming said periphery, vertical to the shoulder 19 of the through-opening 8.

It should also be noted that a substantially axial shock is to be understood as being a shock that is "strictly axial" or "essentially axial" or "partly axial". Similarly, a substantially radial shock is to be understood to be a shock that is "strictly radial" or "essentially radial" or "partly radial".

Moreover, in this description, "substantially parallel" is understood to mean "strictly parallel or essentially parallel".

Such a bearing 1 thus helps to ensure axial and radial recentring/repositioning of the staff of a timepiece component in its rest position after the timepiece has been subjected to a shock or acceleration.

The invention claimed is:

1. A bearing for a timepiece comprising a bearing housing provided with a through-opening, said through-opening comprising a stressed, compact assembly including:

- a first resilient member mounted in a first orifice of the through-opening;
- a second resilient member arranged between the first resilient member and a second orifice of said through-opening;

a pivot element provided for pivoting a staff of a timepiece component, said element being arranged in a central zone of the second resilient member and being positioned facing the second orifice through which said staff of said component can be inserted into said opening, and an endstone element interposed between the first and second resilient members, which is configured to receive an end part of said staff of the component, said endstone element comprising a central part and a peripheral part, the central part comprising a cavity configured to receive a part of the pivot element and said peripheral part comprising a contact zone configured to bear against an entire periphery of a flat upper face of the second resilient member.

2. The bearing according to claim 1, wherein the central part and the peripheral part respectively form a tip and a base of the endstone element.

3. The bearing according to claim 1, wherein the endstone element is mounted so as to be axially movable in the through-opening relative to an axis of revolution of said opening.

4. The bearing according to claim 1, wherein the central part of the endstone element is configured to be inserted into the first orifice of the through-opening in the event of a shock to which the timepiece may be subjected.

5. The bearing according to claim 1, wherein the peripheral part of the endstone element comprises a stop zone configured to cooperate with the first resilient member in the event of a shock to which the timepiece may be subjected.

6. The bearing according to claim 1, wherein the part of the pivot element arranged in the cavity protrudes from the central zone of the second resilient member, said part comprising an outer surface which is positioned in the vicinity of a back of the cavity.

7. The bearing according to claim 1, wherein the first resilient member is configured to deform axially relative to an axis of revolution of the through-opening.

8. The bearing according to claim 1, wherein the first resilient member comprises elements for fastening said member in the through-opening and stressing elements configured to bear against the central part of the endstone element and connecting elements connecting the stressing elements and the fastening elements to each other.

9. The bearing according to claim 1, wherein the second resilient member comprises a part for connecting said member in the through-opening and a part for fastening the pivot element in a central zone of that member, said connecting and fastening parts being connected to each other by at least one resilient element of that member.

10. The bearing according to claim 1, wherein the second resilient member is fixedly mounted in the bearing housing.

11. The bearing according to claim 1, wherein the second resilient member is configured to deform radially relative to an axis of revolution of the through-opening.

12. The bearing according to claim 1, wherein the bearing housing, the through-opening, the first and second resilient members, the endstone element and the pivot element have axes of revolution which are coincident with a central axis of the bearing.

13. An horological movement provided with a bearing according to claim 1.

14. A timepiece comprising a horological movement according to claim 13.

* * * * *